United States Patent [19]
Potter et al.

[11] Patent Number: 6,113,964
[45] Date of Patent: Sep. 5, 2000

[54] REMOVAL OF UNDESIRABLE COMPONENTS FROM A LIQUID OR GAS WITH PROTEINACEOUS OAT MATERIAL

[75] Inventors: Richard C. Potter, Seeley Lake; Steven H. Bixby, Lolo, both of Mont.

[73] Assignee: Nurture, Inc., Missoula, Mont.

[21] Appl. No.: 09/039,977

[22] Filed: Mar. 16, 1998

Related U.S. Application Data

[63] Continuation of application No. 08/705,132, Aug. 29, 1996, abandoned, which is a continuation of application No. 08/280,284, Jul. 26, 1994, abandoned.

[51] Int. Cl.[7] .............................. C12C 3/08; A23J 1/00; A24F 13/06; A24F 1/20
[52] U.S. Cl. ................... 426/422; 426/656; 131/202; 131/203
[58] Field of Search ..................... 426/422, 656, 426/77; 131/202, 203

[56] References Cited

U.S. PATENT DOCUMENTS

| | | |
|---|---|---|
| 3,528,819 | 9/1970 | Hamilton et al. . |
| 3,670,740 | 6/1972 | Takenaka et al. . |
| 3,944,537 | 3/1976 | Saunders et al. . |
| 4,004,038 | 1/1977 | Wickremasinghe . |
| 4,038,992 | 8/1977 | Ogasa et al. . |
| 4,089,848 | 5/1978 | Bell et al. . |
| 4,141,002 | 2/1979 | Spotholz et al. . |
| 4,154,728 | 5/1979 | Oughton . |
| 4,208,259 | 6/1980 | Oughton . |
| 4,208,260 | 6/1980 | Oughton . |
| 4,211,695 | 7/1980 | Oughton . |
| 4,211,801 | 7/1980 | Oughton . |
| 4,407,841 | 10/1983 | Boocock et al. . |
| 4,492,238 | 1/1985 | Wheless . |
| 4,560,571 | 12/1985 | Sato et al. . |
| 4,562,083 | 12/1985 | Gottesman . |

OTHER PUBLICATIONS

Database Abstract. JPO. for JP 359028458A. Inventors: Yahsiro et al, Feb. 15, 1984.
Sheehan, et al., A New Method Of Forming Peptide Bonds, *J. Am. Chem. Soc.*, 77:1067–1068 (1955).
Voutsinas, et al., Covalent Binding Of Methionine And Tryptophan To Soy Protein, *Journal of Food Science* 44:1205–1211 (1979).

*Primary Examiner*—Anthony J. Weier
*Attorney, Agent, or Firm*—Knobbe, Martens Olson & Bear LLP

[57] ABSTRACT

Bitter or otherwise undesirable compounds can be removed from beverages such as tea, coffee or wine by using a natural proteinaceous oat-derived material. This material will also remove noxious compounds such as nicotine from the smoke stream of lighted tobacco products. The liquid or gas is contacted with the material, resulting in the sequestration of the undesirable compounds within the pores of the proteinaceous material.

11 Claims, 11 Drawing Sheets

REMOVAL OF UNDESIRABLE COMPONENTS FROM A LIQUID OR GAS WITH PROTEINACEOUS OAT MATERIAL

This is a continuation application of U.S. patent application Ser. No. 08/705,132, filed Aug. 29, 1996, which is now abandoned which is a continuation application of U.S. patent application Ser. No. 08/280,284, filed Jul. 26, 1994 and now abandoned.

FIELD OF THE INVENTION

The present invention relates to removal of undesirable molecular components from a liquid or gas. More specifically, the invention relates to the use of proteinaceous particulate material derived from seeds for removing undesirable components from consumable materials.

BACKGROUND OF THE INVENTION

The removal of undesirable components from products which are consumed, while retaining the pleasant characteristics of the products, is of considerable interest. Beverages produced by an aqueous extraction process, such as coffee and tea, often contain undesirable flavors. This may be caused by using tea leaves or coffee beans of an inferior quality, or by allowing the extracting water to remain in prolonged contact with the leaves or beans. However, even properly prepared tea or coffee contains dissolved compounds which impart a bitter or astringent taste to the beverage. Since some of these compounds, such as caffeine, have raised concern over potential detrimental health effects, the reduction or removal of these materials from ingested beverages is desirable.

Tea should have a relatively low to mild astringency. Tannins, polyphenolic compounds of molecular weight 500 to 3000, present in tea, are known to interact with salivary proteins in the mouth to form tannin-protein complexes. These complexes can precipitate, resulting in a puckering mouthfeel referred to as astringency. However, once the tannins form soluble complexes, they are much less likely to bind salivary protein. Although some astringency in tea is desired, excessive astringency and bitterness can provide an unpleasant mouthfeel. Thus, reducing the astringency and perceived bitterness of tea is desirable.

Tea beverages should also have a fresh brewed flavor. The principal polyphenols of fresh brewed tea are the theaflavins and the thearubigins. Theaflavins are believed to contribute to black tea flavor and color. Thearubigins are high molecular weight compounds which also contribute to flavor and color. Although theaflavins make significant contributions to the flavor and appearance of a tea beverage, they are almost always present in lower amounts than the thearubigins. However, too high a ratio of thearubigins to theaflavins is indicative of a tea beverage having a flat taste and a dull appearance. Preferred teas have a thearubigin to theaflavin ratio similar to that of fresh brewed tea.

In the case of regular coffee, water is boiled in a coffee pot in advance, and ground roasted coffee beans are directly placed in boiling water (a standard amount is 2.2 g of ground roasted coffee beans per 100 ml of boiling water) and are boiled to effect extraction or are similarly extracted by using a percolator or the like. The resulting extract contains caffeine, tannic acid, saccharides, fats, proteins and various aromatic components and has a good fragrance inherent to coffee and a peculiar complicated flavor inclusive of a bitter taste, an astringent taste and an acid taste. When roasted coffee beans are ground and then allowed to stand in air, they are readily oxidized which degrades the fragrance. When tepid water is used for extraction, the contact time for extraction of roasted coffee beans is increased, thus further degrading the fragrance and flavor. It is thus very difficult to consistently obtain coffee rich in flavor and fragrance.

Reducing or eliminating objectionable flavor components from aqueous extracted beverages has been attempted with cyclodextrins—cyclic oligosaccharides which complex the bitter or otherwise undesirable compounds and mask their taste (U. S. Pat. No. 3,528,819 to Hamilton et al.). Cyclodextrins have also been utilized to produce a dried instant-coffee beverage (U.S. Pat. No. 4,560,571 to Sato et al.) without the accompanying bitter, astringent or acidic flavors. However, using cyclodextrins for this purpose results in ingestion of compounds which have been complexed, posing potential detrimental health effects. In addition, the cyclodextrins are also ingested and may themselves be a health risk. Finally, the cyclodextrins also impart a slightly sweet flavor of their own to the beverage to which they are added.

Utilizing a filtration or chromatography process to selectively remove the compounds which cause cloudiness in iced tea beverages without impairing the full-bodied tea flavor, has also been described (U.S. Pat. No. 4,004,038). However, this is a lengthy process requiring gel filtration, displacement washing to obtain the desirable components and a pH adjustment. This process may also involve the use of organic solvents such as acetone which must then be carefully eliminated to avoid contamination of the resulting product.

The sequestration of undesirable components, such as those found in the smoke from lighted tobacco products, from a vapor phase is also desirable in view of the many health risks known to be associated with second hand smoke. Nicotine, in addition to possessing an acrid, burning taste, is highly toxic (Merck Index, 11th edition, 1989, Merck and Co., Rahway, N.J., No. 6434), addictive, and has been associated with many of the harmful effects of smoking tobacco products. Cellulose acetate filters are commonly employed for the purpose of reducing the amount of nicotine present in smoke, but a substantial amount of nicotine passes through the conventional filter and is inhaled. In addition, the cellulose acetate fibers may contain residual amounts of the chemicals used in their production and, being a semi-synthetic polymer, do not readily degrade in the environment when discarded.

The present invention overcomes the prior art disadvantages by using a proteinaceous particulate material derived from seeds to sequester and remove undesirable components from beverages and tobacco smoke.

SUMMARY OF THE INVENTION

One embodiment of the present invention is a method for removing undesirable molecular components from a liquid or gas composition, comprising the steps of:
  contacting the composition with a particulate proteinaceous material comprising milled seed material for a sufficient time to permit the molecular components to become sequestered within the particulate; and then
  separating the composition from the particulate.

Preferably, the liquid is a caffeinated beverage; most preferably, it is either coffee or tea. In an alternative embodiment, the liquid is an alcoholic beverage. Advantageously, the alcoholic beverage is whether wine or a distilled spirit. According to another aspect of this preferred embodiment, the undesirable component is either caffeine or a tannin. In still another aspect, the gas is tobacco smoke. In an alternate embodiment, the undesirable component is nicotine. In another alternate embodiment, the undesirable component is tar. Preferably, the milled seed material is derived either from oats, beans or peas; most preferably, the milled seed material is derived from oats.

According to another aspect of the invention, there is provided a system for the removal of undesirable molecular components from a liquid or gas comprising a particulate proteinaceous material derived or prepared from milled seed material, the proteinaceous material having the property of entrapping the undesirable molecular component within the proteinaceous material and substantially removing the component from the liquid or gas, and a permeable container enclosing the particulate material, the container adapted to permit the liquid or gas to flow therethrough while retaining the particulate therein. Preferably, the container is a pouch of fibrous material. In an alternative embodiment, the container is a tea bag. In another alternative embodiment, the container is a gas-permeable filter. Preferably, the milled seed material is derived from either oats, beans or peas; most preferably, it comprises oat material.

Another embodiment of the invention is a method for reducing the caffeine content of a beverage, comprising the steps of:
contacting the beverage with a particulate proteinaceous material comprising milled seed material for a sufficient time to permit the caffeine to become sequestered within the particulate; and then
separating the beverage from the particulate.

Advantageously, the beverage is either coffee or tea. Preferably, the milled seed material is derived either from oats, beans or peas; most preferably, the seed is oats.

DETAILED DESCRIPTION OF THE INVENTION

Figure 1:
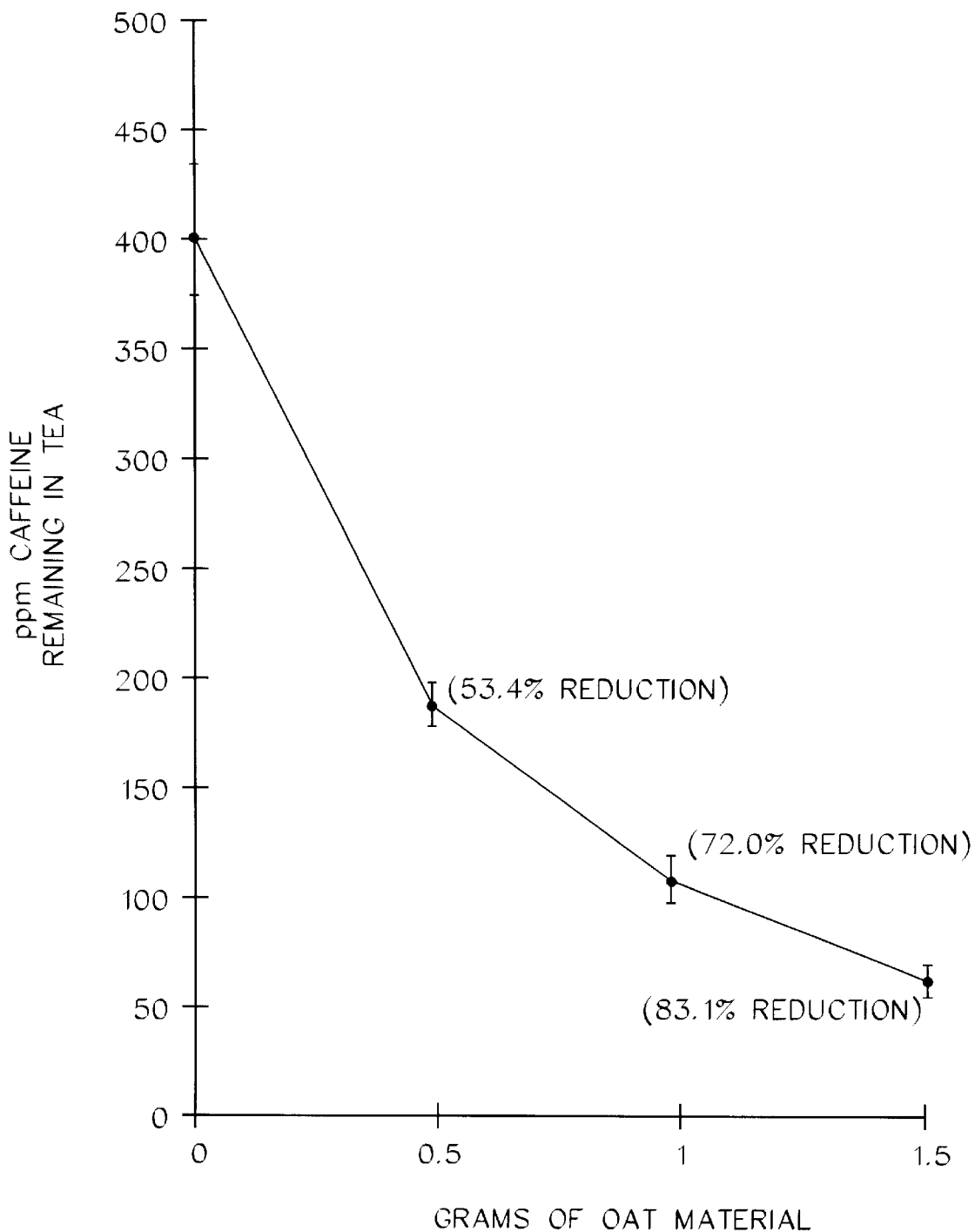
FIG. 1 is a graph illustrating the removal of caffeine from black tea by the proteinaceous oat material.

The present invention utilizes proteinaceous particulate material derived from milled seeds to sequester compounds such as caffeine and tannins from aqueous extracted beverages. In addition, the particulate material will remove bitterness causing compounds from fermented beverages such as wine and will remove harmful components from the stream of smoke passing through lighted tobacco products. Thus, when roasted coffee beans, teas or cereals are extracted with a porous particulate protein according to the present invention, soluble components and aromatic components are extracted at high efficiency, resulting in excellent beverages in which these components are effectively removed.

In short, one aspect of the present invention relates to removal of undesirable molecular components from a liquid or gas. Such components are sometimes deleterious organic compounds, harmful to the health of humans or animals, such as caffeine, nicotine, tar, tannic acid, tannins, bitter flavors and the like. It also includes removal of colors and some objectionable flavors.

As a material derived from milled seed materials such as oats, its natural source ensures its safety in food or beverage products. Its utilization does not require an extensive process to produce its beneficial effects. Simply mixing the tea leaves, instant coffee or other material to be treated with the proteinaceous seed material prior to preparing the beverage is sufficient. In the case of tea, the resulting beverage so produced can be cooled to prepare iced tea which has a greater degree of clarity than untreated tea. In the case of fermented beverages such as wine, submerging a pouch of the material into a quantity of wine to be treated for a short length of time produces the beneficial effect on flavor by removing compounds causing bitterness. It is also contemplated that the material will also effectively remove bitterness causing compounds from other alcoholic beverages including beer and distilled spirits.

Since this material is usually not ingested, it neither contributes to the caloric content of the beverage, nor imparts any foreign flavor. The objectionable flavor components are effectively removed from the beverage and, thus, their deleterious health effects are diminished or eliminated. The treated beverage retains a mellow, smoother taste without sharp or bitter alterations.

The proteinaceous particulate material is also successful at sequestering undesirable or harmful compounds present in the vapor phase, such as in the smoke produced by lighted tobacco products. The proteinaceous particulate material of the present invention, when used as a filter medium in cigarettes, sequesters most of the nicotine which passes through the filter, allowing only a small fraction to continue to where it may be inhaled, thus reducing the health risk. The flavor is also unimpaired by this treatment. Being a natural grain-derived material, it is safe and nontoxic, and offers the additional advantage of being biodegradable.

A. Definitions

As used herein, the term "tea beverage" refers to a drinkable beverage prepared from the tea concentrates of the present invention by dilution with water. The tea concentrates of the present invention are generally diluted with from about 1 to about 40 parts water to provide the tea beverage. Preferred tea concentrates are typically diluted with from about 4 to about 20 parts water to provide the tea beverage.

As used herein, the term "tea solids" refers to those solids normally present in a tea extract. Polyphenolic compounds are normally the primary component of tea solids. However, tea solids can also include caffeine, theobromine, proteins, amino acids, minerals and carbohydrates.

As used herein, the term "comprising" means various components can be conjointly employed in the compositions of the present invention. Accordingly, the term "comprising" encompasses the more restrictive terms "consisting essentially of" and "consisting of".

This invention can be used for sequestration of a wide variety of substances. For example, it may be useful for adsorption of oils in oil-containing waste waters, a phosphate ion in household waste liquors, a fluorine ion in waste liquors from semiconductor factories, cobalt and chlorine ions in cooling water for nuclear reactors, proteins in fermentation discharge liquors, and caffeine; secondary treatment of waste waters; removal of air; removal of ammonia; removal of water (as a dehydrating agent); removal of $CO_2$; decolorization of sucrose, seasonings, wines and liquors; deoxidation of foodstuffs for storage; deoxidation, decolorization and deodorization of high-grade edible oils; regeneration of spent oils; removal of mercury-containing agricultural chemicals; purification of citric acid and food additives; purification of purified water (removal of odors and objectionable flavors); odor reduction; decolorization and purification of surface-active agents, plasticizers, oiling agents, etc.; recovery of dry cleaning solvents; purification of antibiotics, vitamins, etc.; recovery of acetone, toluene, $CS_2$, methyl ethyl ketone, mixed solvents, etc.; removal of nicotine from tobacco; and removal of hydrogen sulfide, methylmercaptan, methyl sulfide, methyl disulfide and trimethylamine.

Proteinaceous Particulate

Useful proteinaceous particulates include proteins derived from seeds. Preferred proteins include those derived from vegetable or grain sources, particularly from grains or legumes including wheat, canola, beans, oats, peas, rapeseed, and soya, with particularly preferred proteins including oats, peas and beans. Sources of proteins which may be subject to treatment often contain various impurities which may negatively affect particulate formation. It is desirable, therefore, that where proteins useful with the invention are naturally associated with such insoluble components as oils, these components be removable prior to processing.

A number of known processes exist for the preparation of a suitable proteinaceous material for use in the present invention. For example, in U.S. Pat. No. 4,089,848 to Bell, the isolation of a proteinaceous fraction from oats is disclosed by extracting lipids from the comminuted oats with a lipophilic solvent, carrying out alkaline and acid precipitation on the residue, and finally isolating the acid soluble protein. More preferably, Oughton, in U.S. Pat. No. 4,154,728, describes another process for separating fractions of differing compositions from comminuted proteinaceous material from a variety of food sources including wheat, rye, barley, triticale, peas and buckwheat. The Oughton process comprises mixing the proteinaceous material with an aliphatic hydrocarbon or alcohol suitable to dissolve the lipids in the material. The wet slurry is distributed by means of centrifugation into fractions which differ primarily in protein composition. A similar process is applied to comminuted oats in U.S. Pat. Nos. 4,211,695 and 4,211,801 to Oughton. Preferred materials are thus typically milled, extracted with an organic solvent, and dried. In a preferred embodiment, no other significant modification of the seed material is effected.

To facilitate recovery of the protein in particulate form from the slurry produced in accordance with the foregoing processes, U.S. Pat. Nos. 4,208,259 and 4,208,260 to Oughton disclose the application of an electric field to the mixture and collection of a comminuted oat fraction which clings to the anode. An improved method of recovery is disclosed in U.S. Pat. No. 4,407,841 to Boocock, comprising the addition of aqueous ethanol to the slurry to agglomerate the proteinaceous material and facilitate separation thereof.

The protein particles are separated to a desired particle size or range of sizes, depending upon the desired properties of the material.

When the protein particulate is derived from natural grains and legumes, the particles will be irregular in shape, due to crushing and fragmenting during the milling process. However, median particle size can be determined by milling parameters or by using a series of graduated sieves or particle size analysis. Additionally, because of their natural origin, the protein particles of the present invention are fully biodegradable, without harmful degradation products.

Many suitable protein concentrates or protein particulates are commercially available. For example, soya protein concentrate is available in 92% pure form from Protein Technologies International, St. Louis, Mo. Pea protein concentrates are available from Woodstone Foods, Winnipeg, Manitoba, Canada. Preferred particulate materials derived from oats are available from Nurture, Inc., Missoula, Mont., under the trademark MICROATS.

The protein particulate is advantageously dried prior to use to remove water, other indigenous volatiles and residual solvents which may have been used in processing. Drying can be accomplished by any of a number of known methods, such as oven drying at elevated temperatures or subjecting the powder to a vacuum with or without the addition of heat.

Modification of Proteins:

Several methods are available to modify the protein particulate. These methods have been generally developed by protein chemists for peptide synthesis. These reactions are generally limited to carboxyl and amino groups in the alpha position. One such well-known method is that of Sheehan and Hess, J. Am. Chemical Soc. 77:1067 (1955). According to this method, the carboxyl group of the protein is activated by a water soluble carbodiimide such as 1-ethyl-3-(3-dimethylaminopropyl) carbodiimide. The carbodiimide-activated intermediate is reactive. The activated group can be further reacted with methionine and tryptophan. Processes for using these modifications of soya protein are known and are described by Voutsinas and Nakai, J. Food Sci. 44:1205 (1979).

The carbodiimide method and other protein derivatization methods can be used to attach molecules that affect the release rates of the active ingredient when in association with the protein particulate. Of course, the particular molecule attached will depend on the characteristics of the active ingredient and the desired release profile. For example, lipid-type materials may be attached to slow the release of lipophilic active ingredients. Hydrogen bonding characteristics may also be used to slow release of appropriate active ingredients by attaching molecules to which the active ingredient will hydrogen bond. Ligand or chelating derivatizing molecules capable of releasably binding the active ingredient are similarly contemplated.

Protein particulates modified by these methods can be used not only to tailor the rate of release, but also to achieve the necessary aesthetics for cosmetic and dermatological applications.

For the purpose of illustration, and not in any way to limit the applicable scope of the present invention, reference is made to the following examples:

EXAMPLE 1

Caffeine Reduction in Tea Brewed With a Proteinaceous Oat Material

Tea solutions were prepared by adding 100 ml hot (95–95° C.) deionized water to a beaker containing a tea bag.

The tea was allowed to brew for 5 minutes, with mild and equal agitation of the bags during this time. The tea bags were then removed from the solutions and discarded. The prepared tea was cooled to room temperature.

Caffeine extractions were performed by removing 3.00 ml of the cooled tea, adding 3.00 ml chloroform, mixing vigorously, and centrifuging at 2000 rpm for 5 minutes. To 0.10 ml of an internal standard solution was added 1.00 ml of the lower chloroform layer.

Caffeine quantification was accomplished using a gas chromatograph equipped with an OV-1 fused silica, wide bore capillary column and a flame ionization detector. A temperature program of 155° C. for 5 minutes, followed by a ramp of 155 to 275° C. at 10° C./minute was used. A standard curve constructed from three caffeine standard solutions was prepared for each group of tea samples. Caffeine concentrations are expressed in parts per million (ppm). Two types of tea bags were used, one being the tube type which is folded over and contains tea on both sides of the fold (flow-through type), and a simple square pouch containing tea in the center (pouch type).

1) Black Tea: Two grams of an orange pekoe and pekoe cut black tea were added to each of eight flow-through type tea bags. Two of the bags were sealed and used as controls. Duplicate bags were then additionally loaded with 0.5, 1.0, or 1.5 g of the proteinaceous oat material (approximately 20% protein and 100–600 micron particle size) and sealed.

The prepared tea solutions showed decreasing caffeine concentrations with increasing oat material amounts (FIG. 1, error bars on all graphs indicate±one standard deviation). The control tea solutions averaged 403 ppm caffeine. However, with 0.5 g of the oat material, caffeine concentration dropped to 188 ppm (53% reduction). Tea prepared with 1.0 g oat material contained 97 ppm caffeine (73% reduction), and that prepared with 1.5 g oat material averaged 84 ppm caffeine (83% reduction).

The teas which were brewed with the proteinaceous oat material had a more pleasant and mild taste, and were considerably less bitter than the control tea.

2) Green Tea: Commercial tea bags containing approximately 2 g green tea were opened and bags containing 0.0, 0.5, 1.0 or 1.5 g of the proteinaceous oat material as described above were prepared. The materials were mixed together and the bags sealed.

Figure 2:
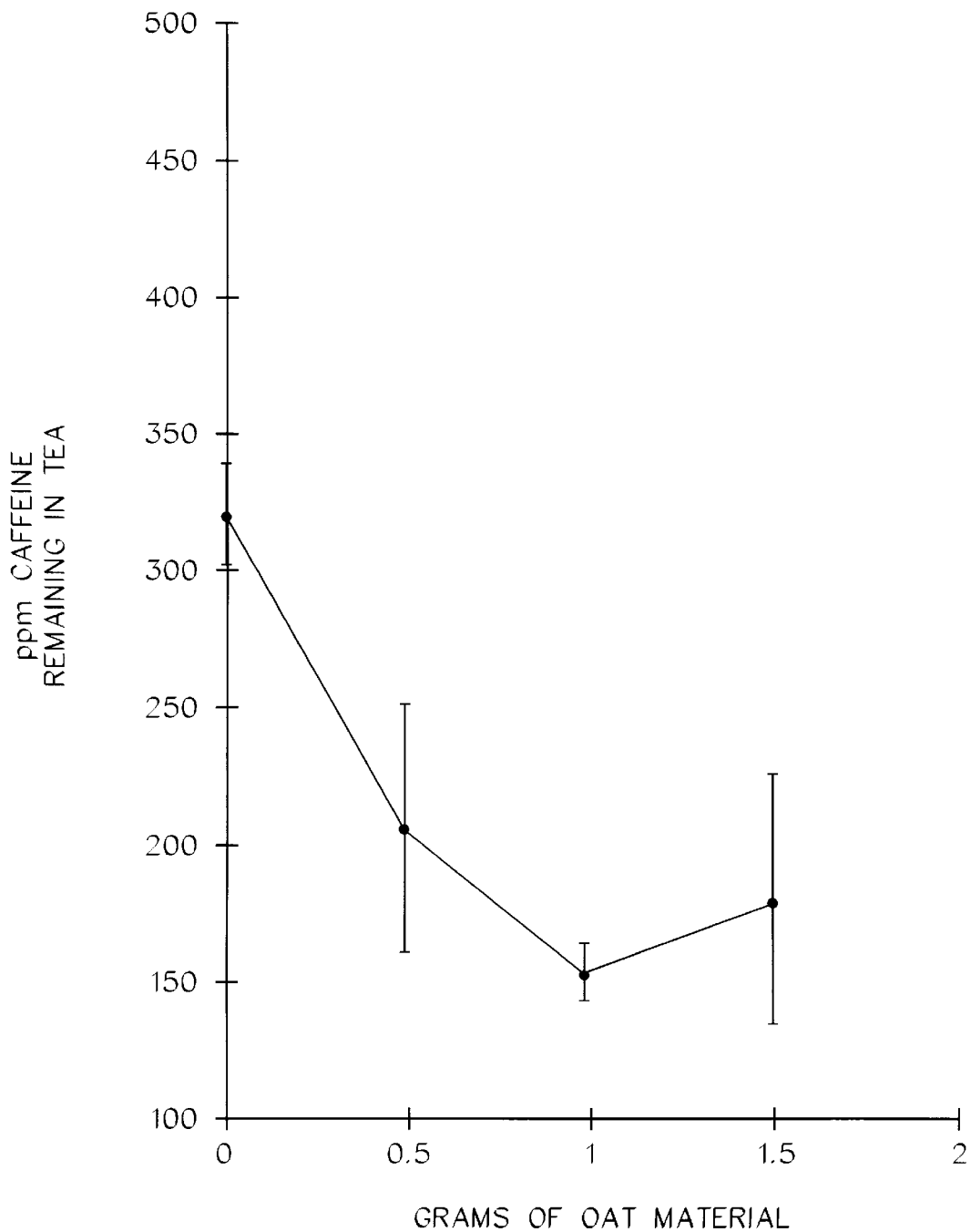
FIG. 2 is a graph illustrating the removal of caffeine from green tea by the proteinaceous oat material.

Caffeine concentrations were measured in the prepared tea solutions. The control tea solutions averaged 320 ppm caffeine (FIG. 2). Tea brewed with 0.5 g of the oat material averaged 206 ppm caffeine (36% reduction). With 1.0 g added oat material, the tea contained 154 ppm caffeine (52% reduction), and with 1.5 g, the tea averaged 182 ppm caffeine (an average 43% reduction) which is an apparent rise, however, the standard deviation includes a possible reduction over the 1.0 g samples.

3) Oolong Tea: Flow-through type tea bags were filled with 2.0 g oolong tea. Two were sealed and used as controls. Duplicate sample bags were then filled with 0.10, 0.50 or 1.00 g of the same type of proteinaceous oat material as described previously, and the bags were sealed.

Figure 3:
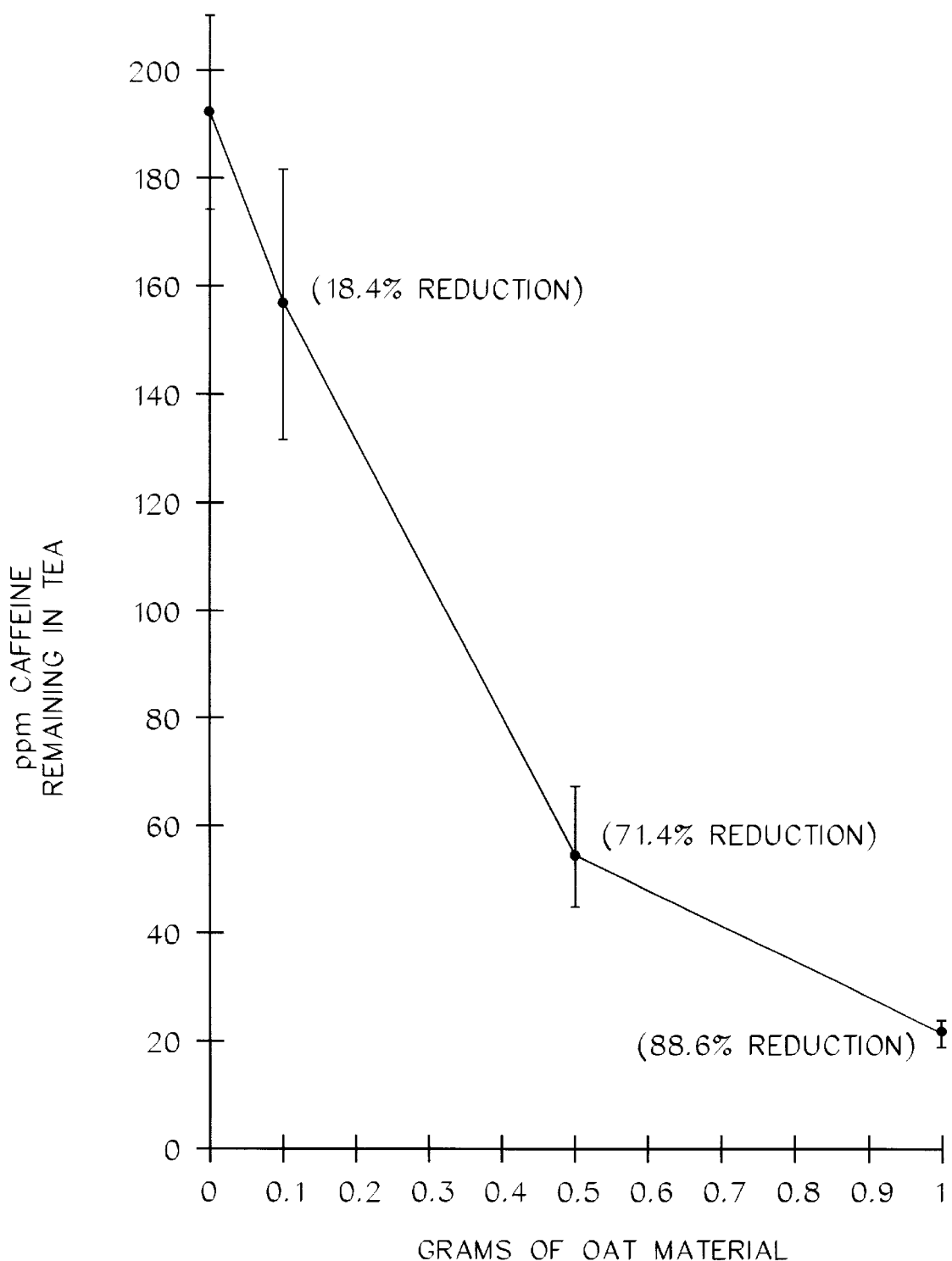
FIG. 3 is a graph illustrating the removal of caffeine from oolong tea by the proteinaceous oat material.

The prepared tea solutions brewed with the oat material showed a reduction in caffeine concentration as compared to the controls (FIG. 3). The controls averaged 192 ppm caffeine. The tea brewed with 0.10 g oat material contained 156 ppm caffeine (18% reduction). With 0.50 g oat material, caffeine concentration dropped to 55 ppm (71% reduction), and the tea prepared with 1.00 g oat material contained 22 ppm (89% reduction).

4) Darjeeling Tea: Flow-through type tea bags were loaded with 2.00 g darjeeling tea per bag. Two were sealed and used as controls. Duplicate bags were then additionally filled with 0.10, 0.50 or 1.00 g of the proteinaceous oat material as described previously and sealed.

Figure 4:
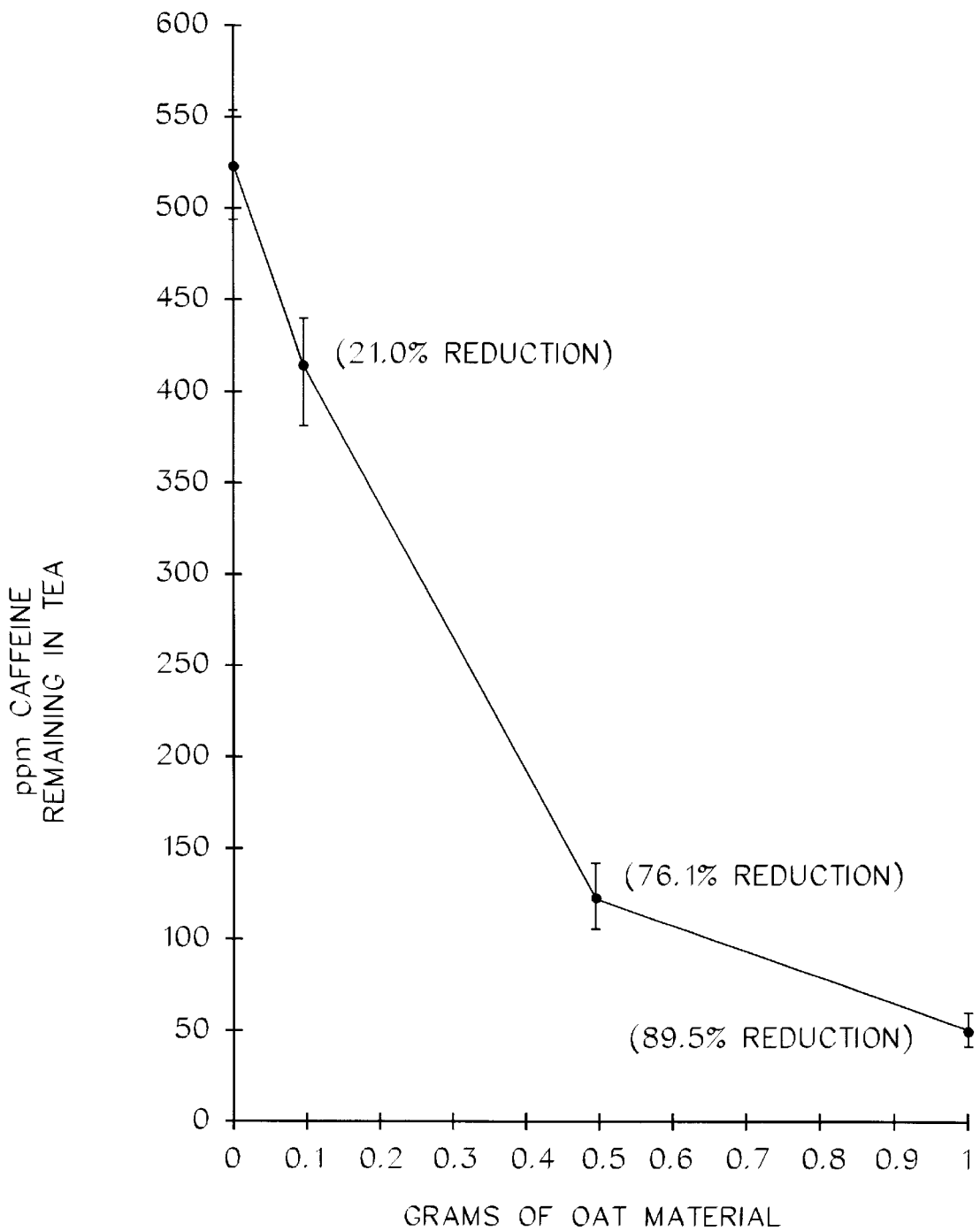
FIG. 4 is a graph illustrating the removal of caffeine from darjeeling tea by the proteinaceous oat material.

Caffeine analyses of the tea solutions were performed. The control teas averaged 523 ppm caffeine (FIG. 4). The tea brewed with 0.10 g oat material contained 413 ppm caffeine (21% reduction). The tea prepared with 0.50 g oat material showed a 76% reduction in caffeine with 125 ppm caffeine remaining. With 1.00 g oat material added, the prepared tea contained 55 ppm caffeine (90% reduction).

EXAMPLE 2

Caffeine Reduction in Instant Tea Prepared With a Proteinaceous Oat Material

Flow-through tea bags were loaded with 1.25 g of a commercial preparation of 100% instant tea. Two bags were sealed and used as controls. Duplicate bags were then prepared containing the tea and 0.25, 0.50 or 0.75 g of the proteinaceous oat material as described in Example 1, and sealed.

The instant tea was prepared by adding 100 ml of hot (95–97° C.) deionized water to beakers containing a tea bag. The bags were allowed to steep until the tea in the control bags had completely dissolved (approximately 5 minutes), then the bags were removed and discarded.

Caffeine was extracted from the tea solutions and concentrations analyzed as in previous examples.

Figure 5:
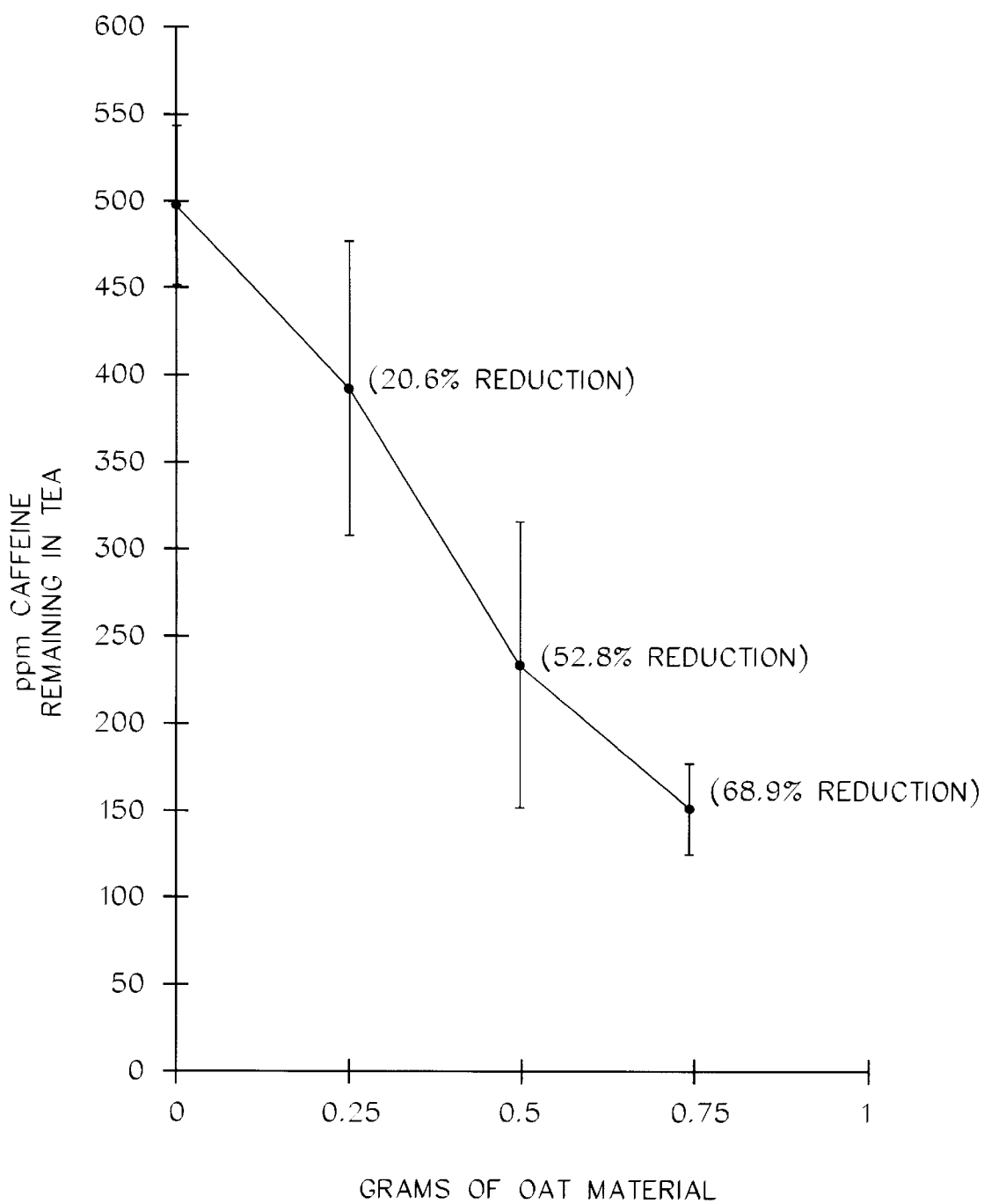
FIG. 5 is a graph illustrating the removal of caffeine from instant tea by the proteinaceous oat material.

This analysis resulted in a value of 499 ppm caffeine in the control solutions (FIG. 5). The instant tea prepared with 0.25 g oat material contained 330 ppm caffeine (21% reduction). With 0.50 g oat material, the tea solutions averaged 236 ppm caffeine (53% reduction), and with 0.75 g oat material, the instant tea averaged 156 ppm caffeine (69% reduction).

EXAMPLE 3

Improving the Clarity of Iced Tea Prepared With a Proteinaceous Oat Material

Flow-through type tea bags were filled with 2.00 g of an orange pekoe and pekoe cut black tea. Two were sealed to use as controls. Duplicate bags were then additionally loaded with 0.10, 0.25 or 0.50 g of the proteinaceous oat material as described in Example 1, and sealed.

Figure 6:
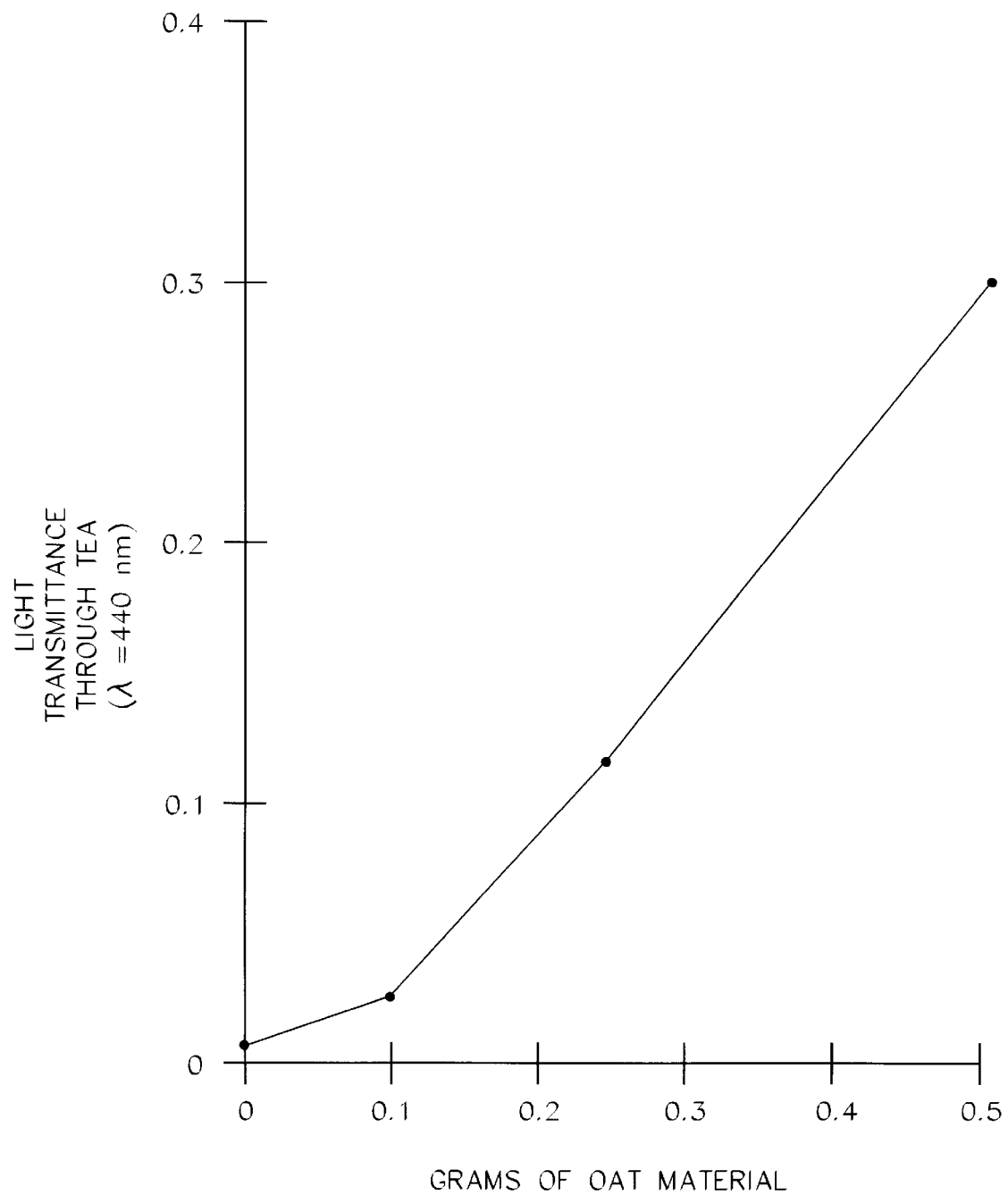
FIG. 6 is a graph illustrating the solution clarity of iced tea prepared with varying amounts of proteinaceous oat material.

The tea was prepared by adding 100 ml of hot (95–97° C.) deionized water to beakers containing a bag, steeping for 5 minutes with gentle agitation, then removing and discarding the bags. While hot, all of the tea solutions were transparent. The teas were cooled to 4° C., and the clarity of the solutions measured while still cold. Clarity was quantified by measuring the transmittance values at a wavelength of 440 nanometers (nm) using a Beckman DU-8 spectrophotometer. The control tea was opaque and gave a transmittance value close to zero (0.005; FIG. 6). Transmittance (and, therefore, clarity) of the solutions increased as the amount of oat material used to prepare the tea increased. Iced tea prepared with 0.10 g oat material gave a transmittance value of 0.026, using 0.25 g oat material gave a value of 0.119, and 0.50 g oat material resulted in a transmittance value of 0.304.

EXAMPLE 4

Caffeine Reduction in Instant Coffee

Flow-through type tea bags were loaded with 2.00 g of instant coffee. Two were sealed and used as controls. Duplicate bags were then additionally filled with 0.25, 0.50 or 0.75 g of the proteinaceous oat material as described in Example 1.

Coffee solutions were prepared by adding 150 ml of hot (95–97° C.) deionized water to beakers containing a bag. The bags were allowed to remain in the water until all of the coffee had dissolved from the control bags (approximately 5 minutes). The bags were then removed and discarded. The coffee solutions were cooled to room temperature.

Caffeine extractions were performed by removing 3.00 ml coffee, adding it to 3.00 ml chloroform, mixing vigorously, then centrifuging at 2000 rpm for 5 minutes. The lower chloroform layers were removed and filtered through a plug of glass wool. A measured amount of the filtered chloroform extracts (ranging from 0.40 ml to 1.00 ml) was added to an internal standard solution, and caffeine analysis performed by gas chromatography as described in previous examples.

Figure 7:
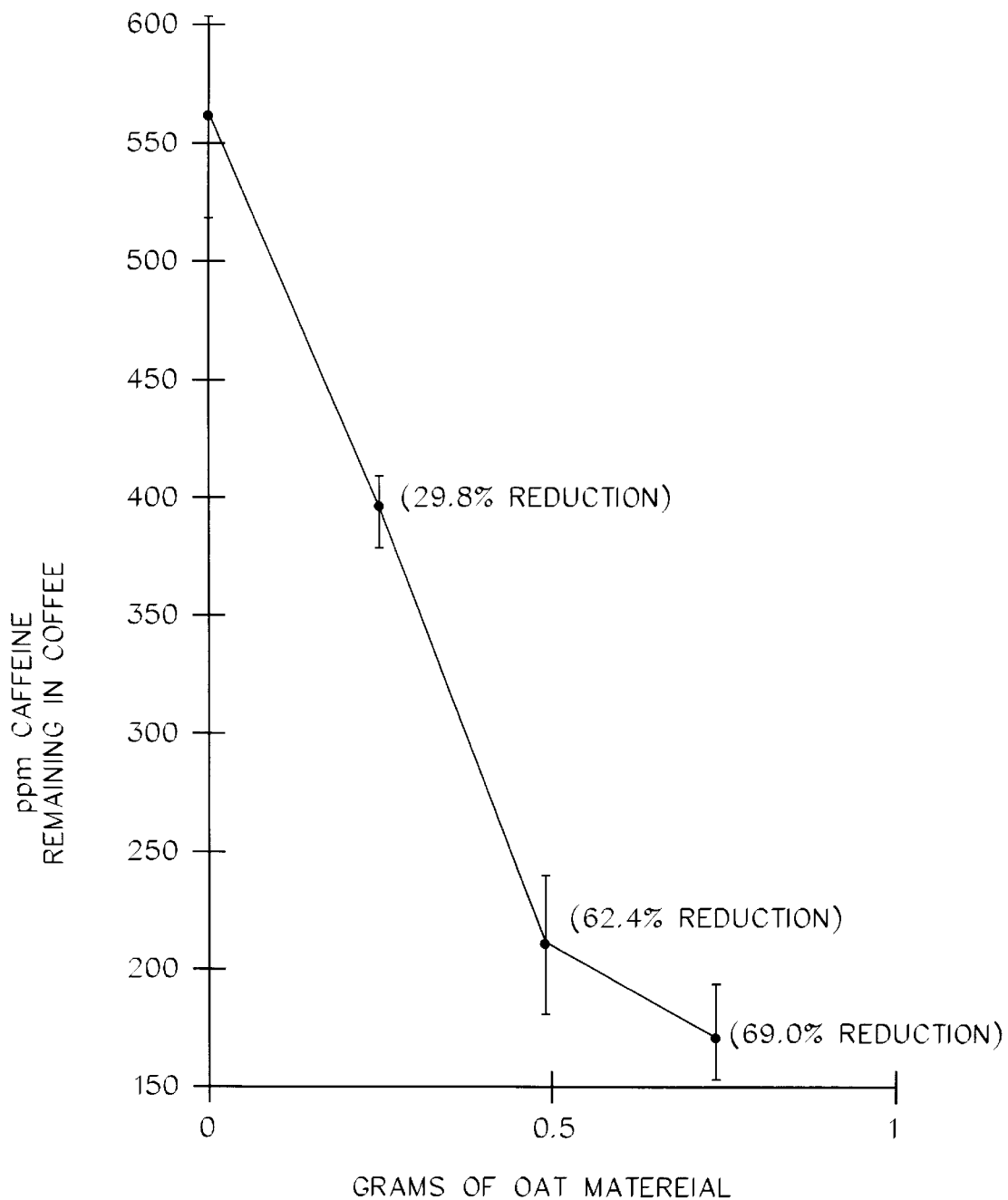
FIG. 7 is a graph illustrating the removal of caffeine from instant coffee by the proteinaceous oat material.

The control coffee solutions gave an average value of 564 ppm caffeine (FIG. 7). The coffee prepared with 0.25 g oat material averaged 396 ppm caffeine (30% reduction). A 62% reduction in caffeine concentration was achieved using 0.50 g of the oat material (212 ppm caffeine), and a 69% reduction with 0.75 g oat material (175 ppm caffeine).

EXAMPLE 5

Color Lightening of Tea Solutions Using the Proteinaceous Oat Material

Two grams of orange pekoe and pekoe cut black tea were loaded into each of eight flow-through type tea bags. Two were sealed and used as controls. Duplicate bags were then additionally filled with 0.50, 1.00 or 1.50 g of the proteinaceous oat material as described in Example 1, and sealed.

Tea solutions were prepared by adding 100 ml hot (95–97° C.) deionized water to beakers containing one of the prepared tea bags. The tea was allowed to brew for 5 minutes with mild agitation, then the tea bags were removed and discarded.

Figure 8:
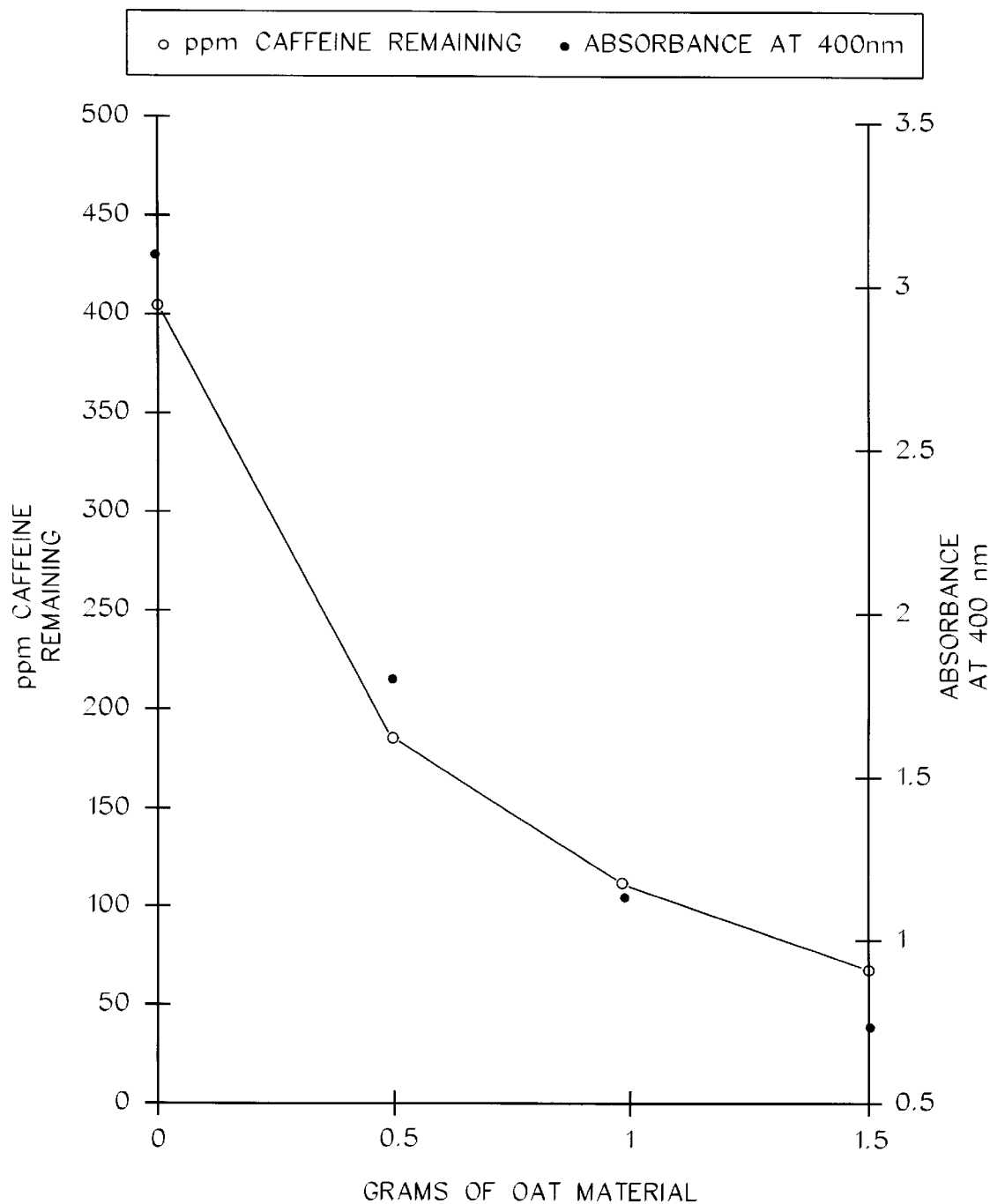
FIG. 8 is a graph illustrating the removal of caffeine and color from black tea by the proteinaceous oat material.

The addition of the oat material to the tea bags resulted in tea which was significantly lighter in color than the controls. This was quantified using a spectrophotometer (Gilford) capable of measuring absorbance at a wavelength of 400 nm. The control tea solutions gave an average absorbance value of 3.08 (FIG. 8, filled circles). Tea prepared with 0.50 g oat material had an average absorbance value of 1.79, that with 1.00 g oat material averaged 1.13, and with 1.50 g oat material the absorbance was reduced to 0.75. FIG. 8 demonstrates how closely the removal of colored components (measured on the same solutions as shown in Example 1, number 1, FIG. 1) parallels the extraction of caffeine in teas prepared with the proteinaceous oat material.

EXAMPLE 6

The Effect of the Degree of Mixing Tea and the Proteinaceous Oat Material on Caffeine Concentration of the Tea Solutions Two control tea bags were prepared by adding 2.00 g of orange pekoe and pekoe cut black tea to one flow-through type and one pouch type tea bag, and sealing. The "no-mixing" samples were prepared by loading 2.00 g of the same tea into duplicate bags of each type, then adding 0.50 g proteinaceous oat material as described in Example 1 and sealing. The "mixed gently" samples were prepared by loading 2.00 g of tea into duplicates of each type of bag, adding 0.50 g oat material, sealing the bags, then shaking gently to partially mix the contents. The "mixed well" samples were prepared by thoroughly mixing 2.00 g of tea with 0.50 g oat material in a beaker before loading the blend into duplicate bags of each type.

Tea solutions were prepared by adding 100 ml hot (95–97° C.) deionized water to beakers containing a bag. The tea was allowed to steep for 5 minutes with mild agitation, then the bags were removed and discarded.

After the tea had cooled to room temperature, 3.00 ml were removed and added to 3.00 ml chloroform, the two layers were vigorously mixed and then centrifuged at 2000 rpm for 5 minutes. From the lower chloroform layer, 1.00 ml was removed and added to 0.10 ml of an internal standard solution.

Caffeine analyses were performed using gas chromatography under the same conditions as described in previous examples.

Figure 9:
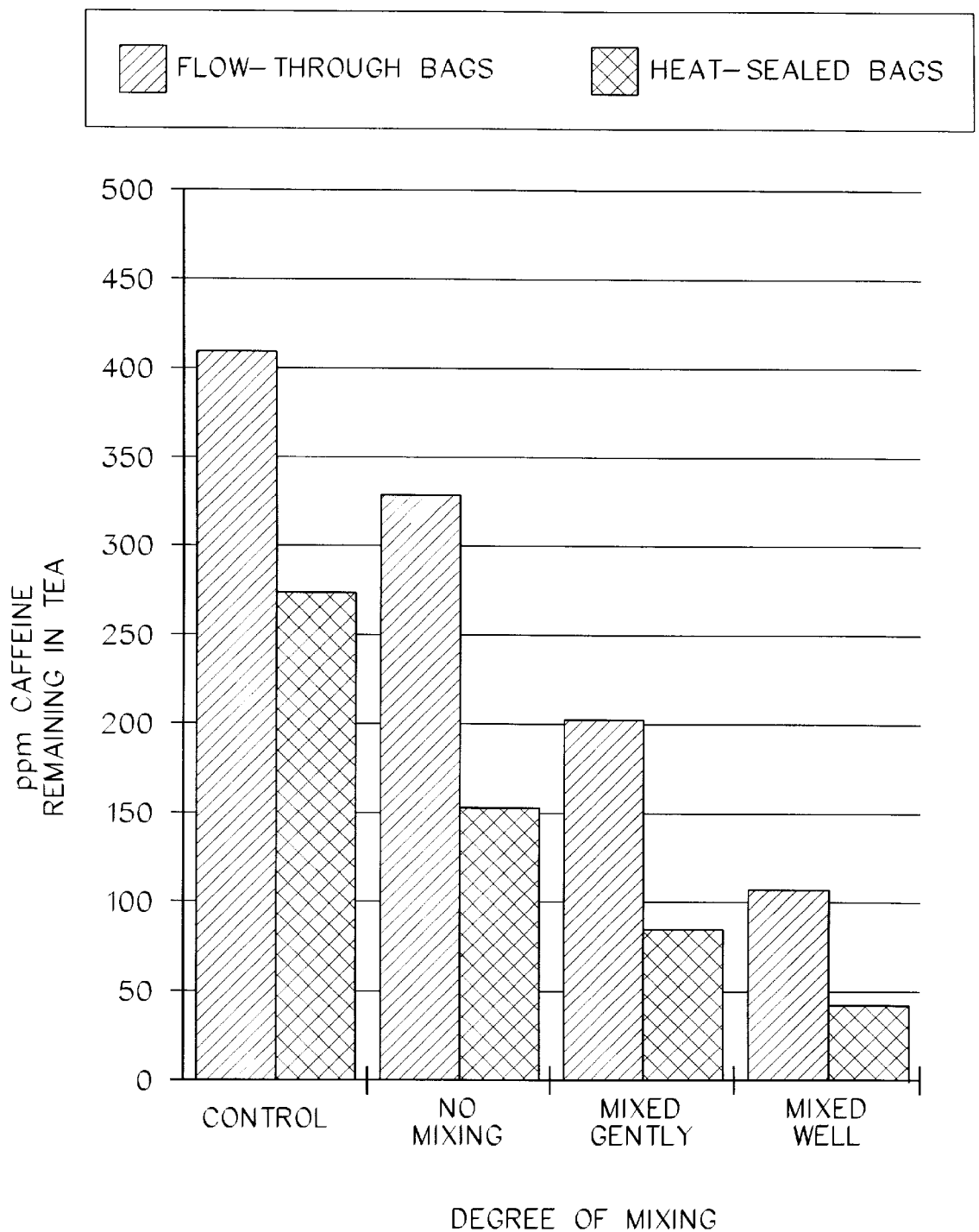
FIG. 9 is a bar graph illustrating the effect of the degree of mixing tea and proteinaceous oat material on the caffeine concentration in the tea.

At each degree of mixing, the tea brewed in the flow-through type bags contained a higher concentration of caffeine than the corresponding tea prepared using the pouch type bag (FIG. 9). This may be due to the closer contact possible between the tea and the hot water with the flow-through type bags. As degree of mixing increased, lower caffeine levels were found in the tea solutions, emphasizing the importance of intimate contact between the proteinaceous oat material and the tea.

EXAMPLE 7

Removal of Nicotine From Cigarette Smoke With the Proteinaceous Oat Material Used in the Filter The filters of commercial cigarettes were removed and partially replaced with measured amounts of the proteinaceous oat material as described in Example 1. Unaltered cigarettes were used as controls. The cigarettes were connected to an apparatus which pulled a gentle, constant stream of air through the cigarette and then through a post-filter trap consisting of 20 ml chloroform cooled to −78° C. The cigarettes were lit after the air stream was established, and were allowed to burn to within 0.5 cm of the filter.

The filters were then removed from the cigarettes and each was extracted by placing the entire filter in 5 ml chloroform, sonicating for 30 minutes, then centrifuging at 2800 rpm for 5 minutes. In the case of filters containing the proteinaceous oat material, the complete filtering device, including the use of two filter plugs (described below) was extracted. From each filter extract and the corresponding post-filter trap solution, 1.00 ml was removed and added to 0.10 ml of an internal standard solution.

The solutions were analyzed for nicotine concentrations using a gas chromatograph equipped with an OV-1 wide bore capillary column, temperature programming of 11° C. for 2 minutes, followed by 110° to 250° C. at 20° C./minute, and detection by flame ionization. A standard curve was constructed by linear regression from the data obtained on three nicotine standard solutions. Nicotine amounts of the samples were obtained using this standard curve.

1) Varying Amounts of the Proteinaceous Oat Material: Cigarette filters were removed and the middle third of the filter cut out and supplanted by 80, 100, 120 or 160 mg of the proteinaceous oat material, in duplicate, which was kept in place by being sandwiched between two short (approximately 0.75 cm) plugs of the original filter. Two unaltered cigarettes were used as controls. The sample and control cigarettes were burned to an equal length while under a constant, gentle vacuum.

Figure 10:
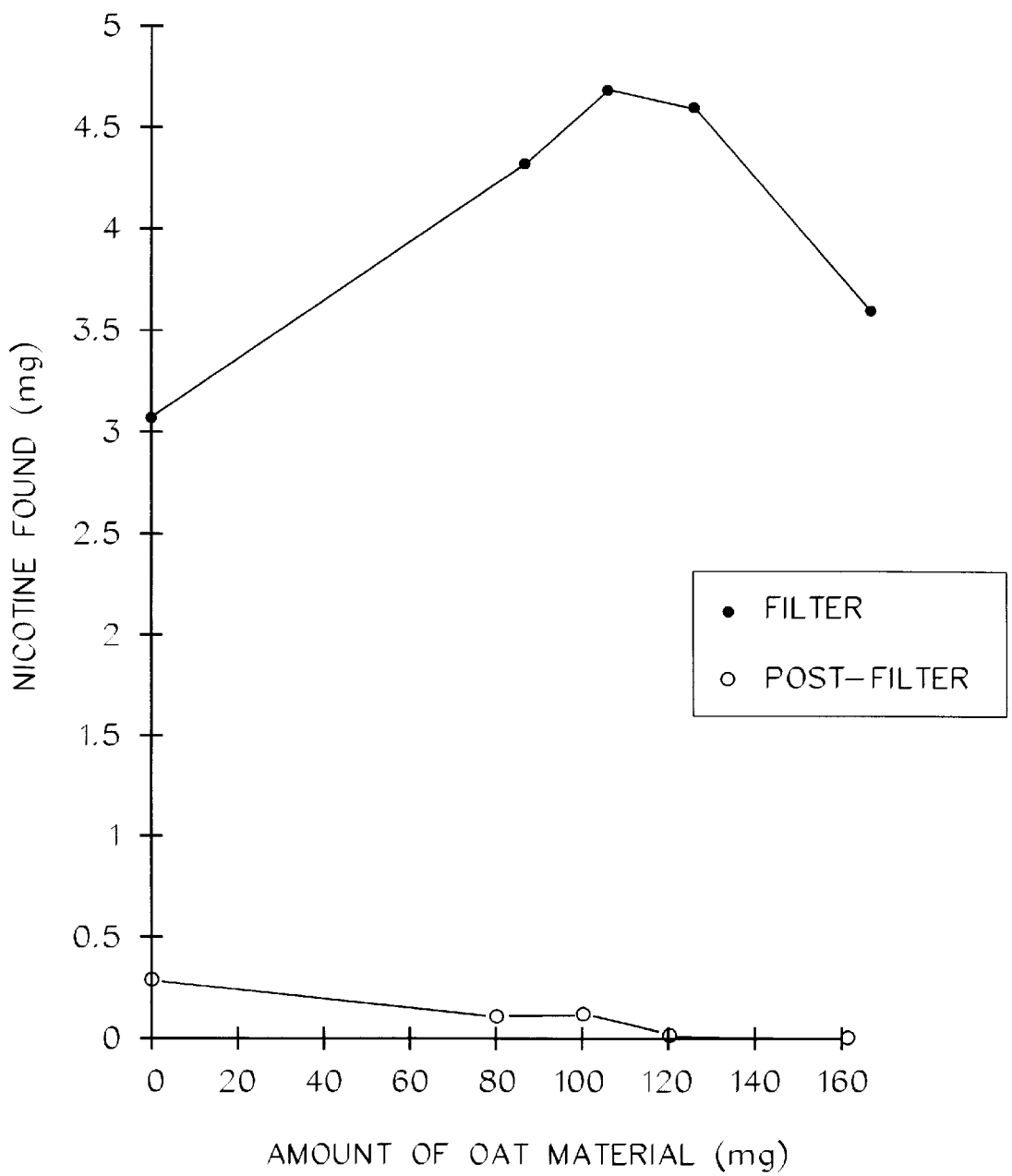
FIG. 10 is a graph illustrating nicotine removal with varying amounts of proteinaceous oat material in cigarette filters.

The control cigarettes, upon quantitative analysis of the filters and post-filter traps, averaged 3.08 mg of nicotine in the filters and 0.25 mg in the post-filter traps (FIG. 10). As the amount of the oat material in the filter increased, the amount of the nicotine trapped by the filter increased, plateauing between 100 and 120 mg of the material. In addition, the corresponding post-filter traps contained less nicotine than those from the controls. This shows that the cigarette filters containing the oat material are capable of trapping higher levels of nicotine than conventional filters, and allow less nicotine to pass out of the cigarette. The filters containing 160 mg of the oat material trapped less nicotine than the other samples, and the corresponding 160 mg post-filter traps were found to contain very little nicotine (<0.005 mg). This may be accounted for by the difficulty of pulling air through a filter containing a loading of 160 mg oat material, resulting in a major loss of nicotine from the burning end of the cigarette.

2) 100 mg Proteinaceous Oat Material: The filters of five cigarettes were removed and partially replaced with 100 mg of the proteinaceous oat material as described above. Five cigarettes were unaltered to use as controls. The filters of five cigarettes were removed and replaced with no additional alteration to determine the effects attributable to this mechanical manipulation. The cigarettes were burned as above, employing the post-filter traps of 20 ml chloroform at −78° C.

Figure 11:
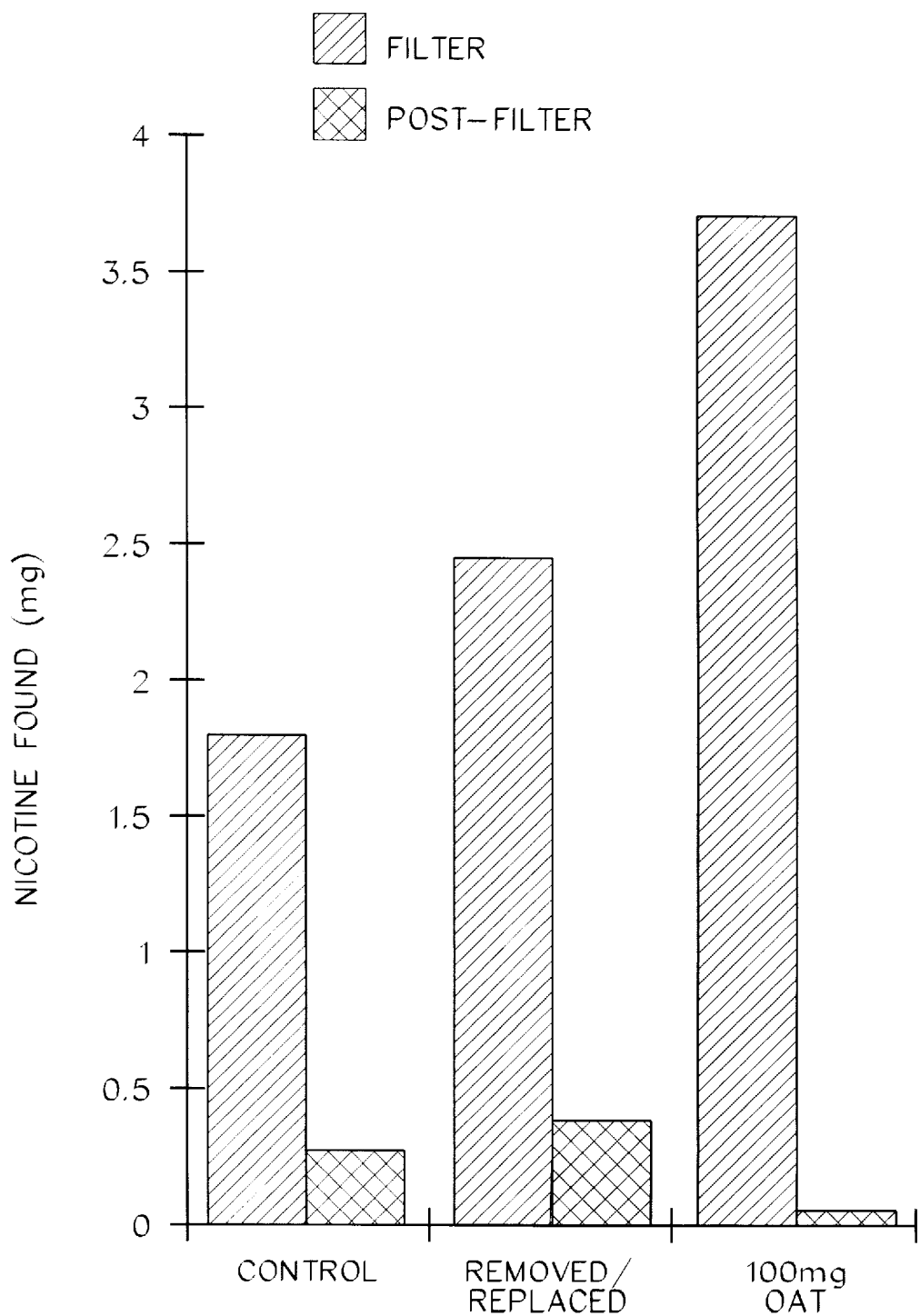
FIG. 11 is a bar graph illustrating nicotine removal with 100 mg proteinaceous oat material in cigarette filters.

The filters were extracted and the extracts and post-filter trap solutions analyzed for nicotine as described previously. The control filters averaged 1.80 mg nicotine trapped, with an amount of 0.287 mg nicotine found in the corresponding post-trap filter solutions (FIG. 11). The filters which had only been removed and replaced averaged 2.48 mg nicotine trapped, with 0.387 mg nicotine found in the corresponding post-filter traps. The filters containing 100 mg of the oat-derived material averaged 3.74 mg nicotine trapped, more than the other filters analyzed. The corresponding post-filter traps contained less nicotine than the other traps, with an average value of 0.074 mg nicotine found.

EXAMPLE 8

Flavor Enhancement of Wine With Addition of a Proteinaceous Oat-Derived Material Large flow-through tea bags were filled, in duplicate, with 3 g or 6 g of the proteinaceous oat material as described in Example 1, and the bags sealed. Portions of a Merlot wine (125 ml) were prepared. Two were left untreated for use as controls. The prepared bags were allowed to steep in the remaining wine portions with gentle agitation for 15 minutes, then were removed and discarded. A blind taste test was conducted using all of the wine samples. The panel found that the wine samples treated with the proteinaceous oat material were considerably less bitter and had a more well-rounded and mellow taste than the controls. The oat material is useful in improving wine flavor.

It should be noted that the present invention is not limited to only those embodiments described in the Detailed Description. Any embodiment which retains the spirit of the present invention should be considered to be within its scope. However, the invention is only limited by the scope of the appended claims.

What is claimed is:

1. A system for the removal of undesirable molecular components from a liquid or gas, comprising:
    a particulate proteinaceous material derived from milled seed material, said proteinaceous material representing a protein-enriched fraction of said seed material, and having the property of entrapping said undesirable components within said proteinaceous material and substantially removing said component from said liquid or gas; and
    a permeable container enclosing said particulate material, said container adapted to permit said liquid or gas to flow therethrough while retaining said particulate therein.

2. The system of claim 1, wherein said container is a pouch of fibrous material.

3. The system of claim 2, wherein said container is a tea bag.

4. The system of claim 1, wherein said container is a gas-permeable filter.

5. The system of claim 1, wherein said milled seed material is selected from the group consisting of oats, beans and peas.

6. The system of claim 5, wherein said milled seed material comprises oat material.

7. A system for the removal of undesirable molecular components from cigarette smoke, comprising:
    a particulate proteinaceous material derived from milled seed material, said proteinaceous material having the property of entrapping said undesirable components within said proteinaceous material and substantially removing said component from said gas; and
    a filter enclosing said particulate material, wherein said filter is associated with a cigarette and adapted to permit said cigarette smoke to flow therethrough while retaining said particulate therein.

8. The system of claim 1, wherein said undesirable molecular component is nicotine.

9. The system of claim 1, wherein said undesirable molecular component is tar.

10. The system of claim 1, wherein said milled seed material is selected from the group consisting of oats, beans and peas.

11. The system of claim 10, wherein said milled seed material is oats.

* * * * *